(12) United States Patent
Hein et al.

(10) Patent No.: US 7,180,999 B1
(45) Date of Patent: Feb. 20, 2007

(54) SUBSCRIBER LINE INTERFACE CIRCUITRY

(75) Inventors: Jerrell P. Hein, Driftwood, TX (US); Navdeep S. Sooch, Austin, TX (US)

(73) Assignee: Silicon Laboratories, Inc., Austin, TX (US)

(*) Notice: Subject to any disclaimer, the term of this patent is extended or adjusted under 35 U.S.C. 154(b) by 0 days.

(21) Appl. No.: 09/298,008

(22) Filed: Apr. 22, 1999

(51) Int. Cl.
*H04M 19/00* (2006.01)

(52) U.S. Cl. .................... 379/398; 379/399.01

(58) Field of Classification Search ........... 379/412, 379/413, 413.01, 27.01, 26.02, 398, 403, 379/399.01; 375/222
See application file for complete search history.

(56) References Cited

U.S. PATENT DOCUMENTS

| | | | |
|---|---|---|---|
| 4,609,781 A | | 9/1986 | Gay |
| 4,709,388 A | * | 11/1987 | Defretin .................. 379/413 |
| 4,827,505 A | | 5/1989 | Takato et al. |
| 4,866,767 A | * | 9/1989 | Tanimoto et al. .......... 379/398 |
| 4,984,266 A | | 1/1991 | Smith |
| 5,175,764 A | | 12/1992 | Patel et al. |
| 5,182,745 A | | 1/1993 | Helchler |
| 5,274,702 A | * | 12/1993 | Rosch et al. .......... 379/399.01 |
| 5,323,460 A | | 6/1994 | Warner et al. |
| 5,347,577 A | | 9/1994 | Takato et al. |
| 5,392,334 A | | 2/1995 | O'Mahony |
| 5,528,682 A | * | 6/1996 | Cotreay .................. 379/377 |
| 5,636,273 A | | 6/1997 | Schopfer et al. |
| 5,659,608 A | * | 8/1997 | Stiefel .................. 379/413.01 |
| 5,721,774 A | * | 2/1998 | Stiefel .................. 379/413 |
| 5,828,748 A | | 10/1998 | Akhteruzzaman |
| 5,848,149 A | | 12/1998 | Chen et al. |
| 5,854,550 A | * | 12/1998 | Knollman ............... 320/127 |
| 5,878,133 A | * | 3/1999 | Zhou et al. .............. 379/413 |

(Continued)

FOREIGN PATENT DOCUMENTS

GB 2032730 A 5/1980

OTHER PUBLICATIONS

AM79213/Am79C203/031 Advanced Subsriber Line Interface Circuit (ASLICTM) Device Advanced Subscriber Line Audio-Processing Circuit (ASLACTM) Device Preliminary Datasheet, Publication #19770, Rev. B, Sep. 1998, p. 13.*

(Continued)

*Primary Examiner*—Sinh Tran
*Assistant Examiner*—Walter F Briney, III
(74) *Attorney, Agent, or Firm*—Davis & Associates; William D. Davis

(57) ABSTRACT

Subscriber line interface circuitry includes an integrated circuit having sense inputs for a sensed tip signal and a sensed ring signal of a subscriber loop. The integrated circuit generates a subscriber loop linefeed driver control signal in response to the sensed signals. The linefeed driver does not reside with the integrated circuit. In one embodiment, the linefeed driver includes power circuitry for providing battery feed to the ring and tip nodes of the subscriber loop in accordance with the linefeed control signal. The linefeed driver includes sense circuitry providing a sensed tip signal and a sensed ring signal. The sensed tip and ring signals correspond to a tip current and a ring current of the subscriber loop. In one embodiment, the integrated circuit is a complementary metal oxide semiconductor (CMOS) integrated circuit. In one embodiment, the linefeed driver comprises only discrete components.

23 Claims, 5 Drawing Sheets

U.S. PATENT DOCUMENTS

| | | | | |
|---|---|---|---|---|
| 5,881,129 | A | * | 3/1999 | Chen et al. ............... 379/26.02 |
| 5,926,544 | A | * | 7/1999 | Zhou .......................... 379/413 |
| 6,178,241 | B1 | | 1/2001 | Zhou |
| 6,219,417 | B1 | * | 4/2001 | Zhou .......................... 379/377 |
| 6,263,015 | B1 | | 7/2001 | Awata et al. |
| 6,263,016 | B1 | * | 7/2001 | Bellenger et al. ........... 370/231 |
| 6,301,358 | B1 | * | 10/2001 | Chen et al. ................. 379/413 |
| 6,934,384 | B1 | | 8/2005 | Hein et al. |

OTHER PUBLICATIONS

Advanced Micro Devices, "Am7920: Subscriber Line Interface Circuit Preliminary Datasheet," Publication #19239, 'Rev. E, Jul. 1998.

Advanced Micro Devices, "Am79213/Am79C203/031: Advanced Subscriber Line Interface Circuit (ASLIC™) Device/Advanced Subscriber Line Audio-Processing Circuit (ASLAC™) Device Preliminary Datasheet," Publication #19770, Rev. B, Sep. 1998.

Advanced Micro Devices, "Am79231: Intelligent Subscriber Line Interface Circuit (ISLIC™) Advance Information Datasheet," Publication #22419, Rev. A, Sep. 1998.

Advanced Micro Devices, "Am79Q2241/2242/2243: Quad Intelligent Subscriber Line Audio-Processing Circuit (ISLAC™) Advance Information Datasheet," Publication #22421, Rev. A, Sep. 1998.

Advanced Micro Devices, "Am79R241: Intelligent Subscriber Line Interface Circuit (ISLIC™) Advance Information Datasheet," Publication #22420, Rev. A, Sep. 1998.

Advanced Micro Devices, "Am79R79: Ringing SLIC Device Technical Overview Application Note," Publication #19768, Rev. B, May 1997.

Lucent Technologies, "L8576 Dual Ringing SLIC Preliminary Datasheet," Mar. 1998.

SGS-Thomson Microelectronics, "L3000N/L3030 Subscriber Line Interface Kit Preliminary Data," Jan. 1995.

SGS-Thomson Microelectronics, "L3000S/L3030 Subscriber Line Interface Kit Preliminary Data," Jun. 1997.

SGS-Thomson Microelectronics, "L3037 Subscriber Line Interface Circuit," Dec. 1997.

SGS-Thomson Microelectronics, "SGS-Thomson SLIC AC Models Application Note," 1995.

Goodenough, F., "SLIC Ejects Relays From PABX Line Cards", Electronic Design, vol. 42, No. 14, Jul. 11, 1994, pp. 55-56, 58-59, 62-64, Penton Publishing, Cleveland, OH.

U.S. Appl. No. 11/093,730, filed Mar. 30, 2005, Hein et al.

* cited by examiner

SUBSCRIBER LINE INTERFACE CIRCUITRY

FIELD OF THE INVENTION

This invention relates to the field of telecommunications. In particular, this invention is drawn to subscriber line interface circuitry.

BACKGROUND OF THE INVENTION

Subscriber line interface circuits are typically found in the central office exchange of a telecommunications network. A subscriber line interface circuit (SLIC) provides a communications interface between the digital switching network of a central office and an analog subscriber line. The analog subscriber line connects to a subscriber station or telephone instrument at a location remote from the central office exchange.

The analog subscriber line and subscriber equipment form a subscriber loop. The interface requirements of an SLIC typically result in the need to provide relatively high voltages and currents for control signaling with respect to the subscriber equipment on the subscriber loop. Voiceband communications are typically low voltage analog signals on the subscriber loop. Thus the SLIC must detect and transform low voltage analog signals into digital data for transmitting communications received from the subscriber equipment to the digital network. For bi-directional communication, the SLIC must also transform digital data received from the digital network into low voltage analog signals for transmission on the subscriber loop to the subscriber equipment.

One SLIC design includes discrete passive inductive components such as transformers for handling the higher voltages and currents. Disadvantages of this design include the bulkiness, weight, and power consumption of the passive inductive components.

Another SLIC design incorporates multiple specialized integrated circuits to achieve a transformerless SLIC. Typically one integrated circuit is dedicated to handling the low voltage digital signaling and another integrated circuit is dedicated to handling the higher powered analog control signaling functions required for the subscriber loop. One disadvantage of this design is that programming of various SLIC operational characteristics is typically accomplished using discrete components such that the SLIC operational characteristics are not dynamically modifiable. In addition, the integrated circuit handling the higher powered analog control signaling functions tends to be relatively expensive.

SUMMARY OF THE INVENTION

In view of limitations of known systems and methods a subscriber line interface circuit is described. The subscriber line interface circuitry includes an integrated circuit signal processor having sense inputs for a sensed tip signal and a sensed ring signal of a subscriber loop. The integrated circuit generates a subscriber loop linefeed driver control signal in response to the sensed signals. The linefeed driver does not reside within the integrated circuit. In one embodiment, the linefeed driver includes power circuitry for providing battery feed to the ring and tip nodes of the subscriber loop in accordance with the linefeed control signal. The linefeed driver includes sense circuitry providing a sensed tip signal and a sensed ring signal. The sensed tip and ring signals correspond to a tip current and a ring current of the subscriber loop. The integrated circuit can be a low voltage integrated circuit. In one embodiment, the integrated circuit is a complementary metal oxide semiconductor (CMOS) integrated circuit. In one embodiment, the linefeed driver comprises only discrete components.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
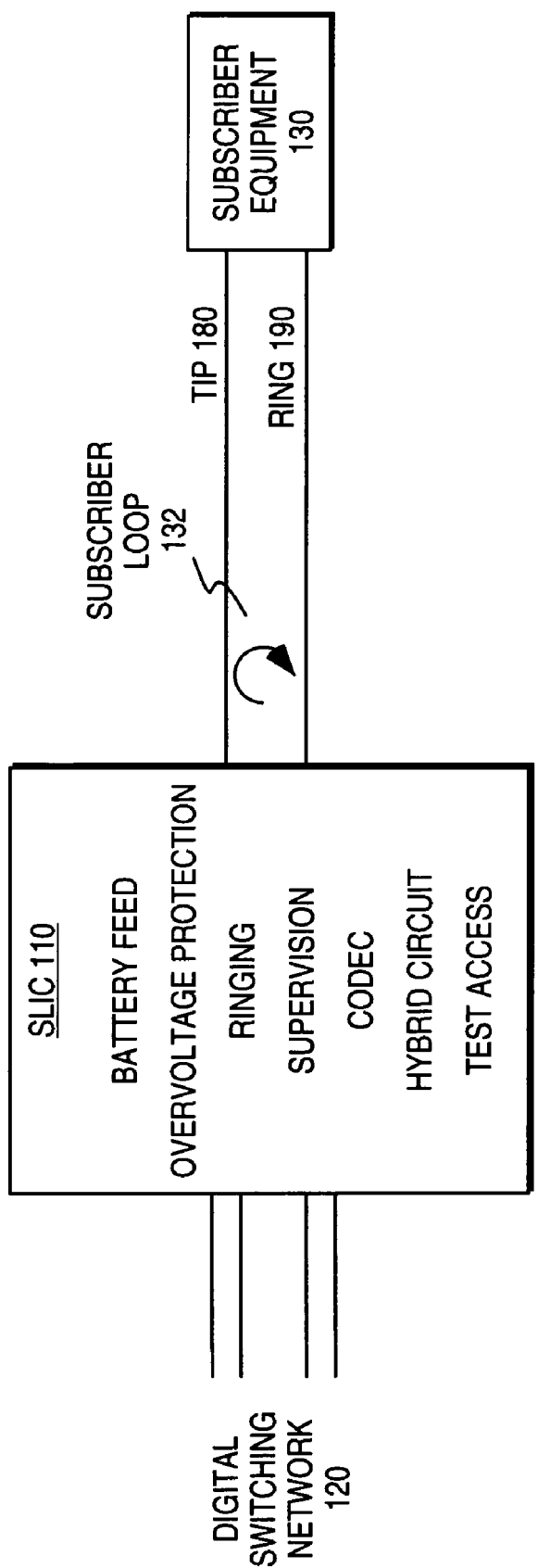
FIG. 1 illustrates one embodiment of a central office exchange including a subscriber line interface circuit (SLIC) coupling subscriber equipment to a digital switching system.

FIG. 1 illustrates functional elements of one embodiment of a subscriber line interface circuit (SLIC) 110 typically associated with plain old telephone services (POTS) telephone lines. The subscriber line interface circuit (SLIC) provides an interface between a digital switching network 120 of a local telephone company central exchange and a subscriber loop 132 including subscriber equipment 130.

The subscriber loop 132 is typically used for communicating analog data signals (e.g., voiceband communications) as well as subscriber loop "handshaking" or control signals. The analog data signals are typically on the order of 1 volt peak-to-peak (i.e., "small signal"). The subscriber loop control signals typically consist of a 48 V d.c. offset and an a.c. signal of 40–140 Vrms (i.e., "large signal"). The subscriber loop state is often specified in terms of the tip 180 and ring 190 portions of the subscriber loop.

The SLIC is expected to perform a number of functions often collectively referred to as the BORSCHT requirements. BORSCHT is an acronym for "battery feed," "overvoltage protection," "ring," "supervision," "codec," "hybrid," and "test."

The SLIC provides power to the subscriber equipment 130 using the battery feed function. The overvoltage protection function serves to protect the central office circuitry against voltage transients that may occur on the subscriber loop 132. The ring function enables the SLIC to signal the subscriber equipment 130. In one embodiment, subscriber equipment 130 is a telephone. Thus, the ring function enables the SLIC to ring the telephone.

The supervision function enables the SLIC to detect service requests such as when the caller goes off-hook. The supervision function is also used to supervise calls in progress and to detect dialing input signals.

The hybrid function provides a conversion from two wire signaling to four wire signaling. The SLIC includes a codec to convert the four-wire analog voiceband data signal into serial digital codes suitable for transmission by the digital switching network 120. In one embodiment, pulse code modulation is used to encode the voiceband data. The SLIC also typically provides a means to test for or to indicate faults that may exist in the subscriber loop or the SLIC itself.

The codec function has relatively low power requirements and can be implemented in a low voltage integrated circuit operating in the range of approximately 5 volts or less. The battery feed and supervision circuitry typically operate in the range of 40–75 volts. In some implementations the ringing function is handled by the same circuitry as the battery feed and supervision circuitry. In other implementations, the ringing function is performed by higher voltage ringing circuitry (75–150 $V_{rms}$). Thus depending upon implementation, the ringing function as well as the overvoltage protection function may be associated with circuitry having greater voltage or current operating requirements than the other circuitry.

Recent transformerless SLIC designs tend to distribute the functional requirements between two integrated circuits based on whether the functions are traditionally associated with the high voltage subscriber loop controls or the low voltage data processing. For example, in one embodiment, the codec is implemented in a low voltage integrated circuit and the remaining functions (e.g., supervision) are implemented primarily in a high voltage integrated circuit such as a bipolar integrated circuit. Although this design tends to offer considerable space, weight, and power efficiencies over designs requiring passive inductive components, this distribution of the functional requirements tends to result in a relatively expensive high voltage integrated circuit.

Figure 2:
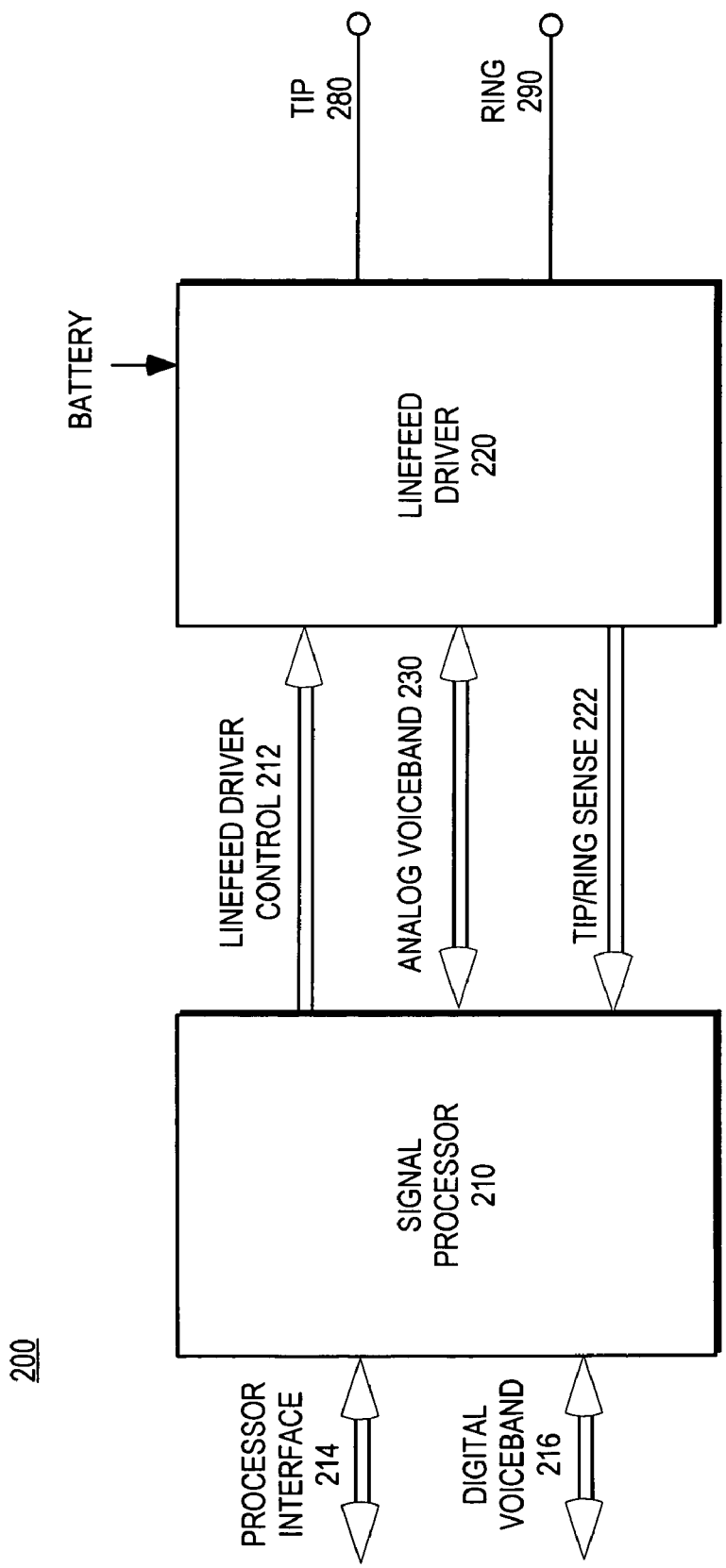
FIG. 2 illustrates a block diagram of an SLIC including a signal processor and a linefeed driver.

FIG. 2 illustrates one embodiment of an SLIC 200 wherein the BORSCHT functions have been redistributed between a signal processor 210 and a linefeed driver 220. Signal processor 210 is responsible for at least the ring control, supervision, codec, and hybrid functions. Signal processor 210 controls and interprets the large signal subscriber loop control signals as well as handling the small signal analog voiceband data and the digital voiceband data.

In one embodiment, signal processor 210 is an integrated circuit. The integrated circuit includes sense inputs for a sensed tip and ring signal of the subscriber loop. The integrated circuit generates subscriber loop linefeed driver control signal in response to the sensed signals. In one embodiment, the linefeed driver does not reside within the integrated circuit or within the same integrated circuit package as the signal processor 210.

Signal processor 210 receives subscriber loop state information from linefeed driver 220 as indicated by tip/ring sense 222. This information is used to generate control signals for linefeed driver 220 as indicated by linefeed driver control 212. The voiceband 230 signal is used for bi-directional communication of the analog voiceband data between linefeed driver 220 and signal processor 210.

Signal processor 210 includes a digital interface for communicating digitized voiceband data to the digital switching network using digital voiceband 216. In one embodiment, the digital interface includes a processor interface 214 to enable programmatic control of the signal processor 210. The processor interface effectively enables programmatic or dynamic control of battery control, battery feed state control, voiceband data amplification and level shifting, longitudinal balance, ringing currents, and other subscriber loop control parameters as well as setting thresholds such as a ring trip detection thresholds and an off-hook detection threshold.

The digital voiceband data 216 is coupled to a digital codec interface of signal processor 210 for bi-directional communication of the digital voiceband data between the codec of the signal processor and the digital switching network. The analog voiceband data 230 is coupled to an analog codec interface of signal processor 210 for bi-directional communication of the analog voiceband data between the codec and the linefeed driver.

Linefeed driver 220 maintains responsibility for battery feed to tip 280 and ring 290. Overvoltage protection is not explicitly illustrated, however, overvoltage protection can be provided by fuses incorporated into linefeed driver 220, if desired. Linefeed driver 220 includes sense circuitry to provide signal processor 210 with pre-determined sensed subscriber loop operating parameters as indicated by tip/ring sense 222. Signal processor 210 performs any necessary processing on the sensed parameters in order to determine the operational state of the subscriber loop. For example, differences or sums of sensed voltages and currents are performed as necessary by signal processor 210 rather than linefeed driver 220. Thus common mode and differential mode components (e.g., voltage and current) of the subscriber loop are calculated by the signal processor rather than the linefeed driver.

Linefeed driver 220 modifies the large signal tip and ring operating conditions in response to linefeed driver control 212 provided by signal processor 210. This arrangement enables the signal processor to perform processing as needed to handle the majority of the BORSCHT functions. For example, the supervisory functions of ring trip, ground key, and off-hook detection can be determined by signal processor 210 based on operating parameters provided by tip/ring sense 222.

Figure 3:
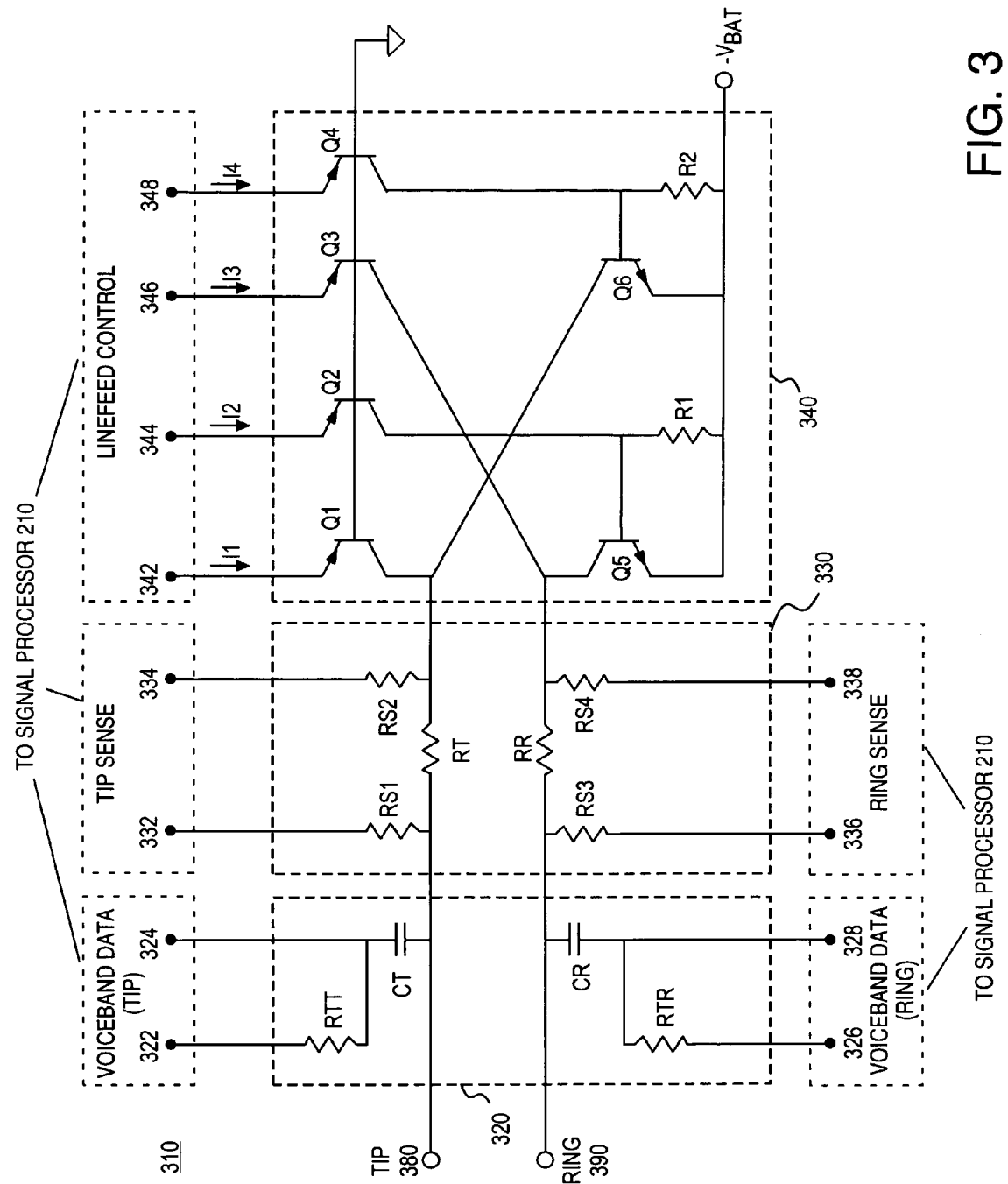
FIG. 3 illustrates one embodiment of an SLIC linefeed driver.

FIG. 3 illustrates one embodiment of a SLIC linefeed driver 310. In one embodiment, the linefeed driver 310 is implemented as a number of discrete components. Linefeed driver 310 includes voiceband circuitry 320, sensing circuitry 330, and power circuitry 340.

Voiceband circuitry 320 enables data signals corresponding to voiceband communications to be retrieved from or impressed onto the subscriber loop. Capacitors CR and CT effectively provide a.c. coupling for the analog voiceband data from the subscriber loop to the signal processor while decoupling signal processor 210 from the d.c. offsets of the tip 380 and ring 390 nodes. Thus capacitors CR and CT effective provide d.c. isolation of the analog voiceband data interface formed by nodes 322–328 from the subscriber loop. In the embodiment illustrated, voiceband circuitry 320 provides a.c. coupling of the analog voiceband data between the subscriber loop and the signal processor using only passive components.

Voiceband communication is bi-directional between the subscriber loop and signal processor 210. Nodes 324 and 328 serve to communicate voiceband data from the subscriber loop to signal processor 210 (i.e., tip and ring "audio in"). Nodes 322 and 326 provide a means of impressing a signal on the subscriber loop from signal processor 210 (i.e., tip and ring "audio out"). In one embodiment RTT and RTR collectively establish a 600Ω termination impedance.

Sensing circuitry 330 enables signal processor 210 to determine the tip 380 and ring 390 node voltages as well as the subscriber loop current using sensing resistors RS1, RS2, RS3, and RS4. Resistors RT and RR are used to generate a voltage drop for determining the tip and ring currents. In one embodiment, sensing circuitry 330 consists only of passive discrete components.

Referring to FIG. 2, tip/ring sense 222 includes a sensed tip signal and a sensed ring signal. In one embodiment, the sensed tip signal includes first and second sampled tip voltages. Resistors RS1 and RS2 are used to sample the tip line voltage at each end of RT. Resistors RS1 and RS2 convert the sampled tip line voltages to currents suitable for handling by signal processor 210 at nodes 332 and 334. The difference between the first and second sampled tip voltages is proportional to the tip current. Likewise, the sensed ring signal includes first and second sampled ring voltages. Resistors RS3 and RS4 similarly convert sampled ring line voltages at both ends of RR to currents suitable for handling by signal processor 210 at nodes 336 and 338. The difference between the first and second sampled ring voltages is proportional to the ring current. These calculations, however, can be performed as necessary by the signal processor 210 rather than the linefeed driver 220 circuitry. In addition, these sensed parameters enable the signal processor 210 to determine the subscriber loop voltage and the subscriber loop common mode and differential mode currents.

Power circuitry 340 provides the battery feed and other relatively high voltage functions to the subscriber loop in accordance with analog linefeed control signals provided by the signal processor 210 at nodes 342, 344, 346, and 348. Processing of the sensed parameters of the tip and ring lines for generating the linefeed control signals is handled exclusively by signal processor 210.

The subscriber loop current and the tip and ring voltages are controlled by transistors Q1–Q6. In one embodiment, Q1–Q4 are PNP bipolar junction transistors and Q5–Q6 are NPN bipolar junction transistors. Given that the base terminals of Q1–Q4 are coupled to ground, nodes 342–348 need only be approximately 0.7 volts to turn on transistors Q1–Q4. Due to the small voltage drop between the base and emitters of Q1–Q4, control of the linefeed circuitry requires relatively low power and thus linefeed driver control currents I1–I4 may be provided by a signal processor 210 implemented as a low voltage complementary metal oxide semiconductor (CMOS) integrated circuit.

Transistors Q1, Q4, and Q6 (and resistor R2) control the tip voltage 380. The tip voltage is increased by the application of control current I1 to Q1. The tip voltage (node 380) is decreased by the application of control current I4 to Q4. Thus control currents I1 and I4 effectively provide a tip control signal for manipulating the tip voltage at node 380.

Similarly, transistors Q2, Q3, and Q5 (and resistor R1) control the ring voltage 390. The application of control current I3 to Q3 increases the ring voltage. The ring voltage is decreased by the application of control current I2 to Q2. Control currents I2 and I3 effectively provide a ring control signal for manipulating the ring voltage at node 390.

Control currents I1–I4 thus effectively control the large signal subscriber loop current and tip and ring voltages. For example, the ringing signal can be generated by using the control signals at nodes 342–348 to periodically reverse the polarity of tip 380 with respect to ring 390 (i.e., battery polarity reversal) at the nominal ringing frequency.

Sensing portion 330 enables signal processor 210 to determine the large signal state of the subscriber loop without the need for intervening active circuitry or level shifters. In one embodiment, sensing portion 330 comprises only passive discrete components. The linefeed control inputs 342–348 enable signal processor 210 to actively manage the large signal state of the subscriber loop. In particular, the large signal a.c. and d.c. components of the subscriber loop control protocol can now be controlled directly by a low voltage integrated circuit. The large signal a.c. and d.c. control loops are effectively terminated at the signal processor 210.

In other words, the large signal a.c. and d.c. control loops are terminated at the low voltage integrated circuit. Thus signal processing and state determination such as off-hook, ring trip, and ring control formerly associated with high power analog circuitry can be handled predominately by a low voltage integrated circuit. In addition, the integrated circuit signal processor can handle processing of the small signal analog voiceband data from the subscriber loop without the need for intervening active elements or level shifting circuitry.

Figure 4:
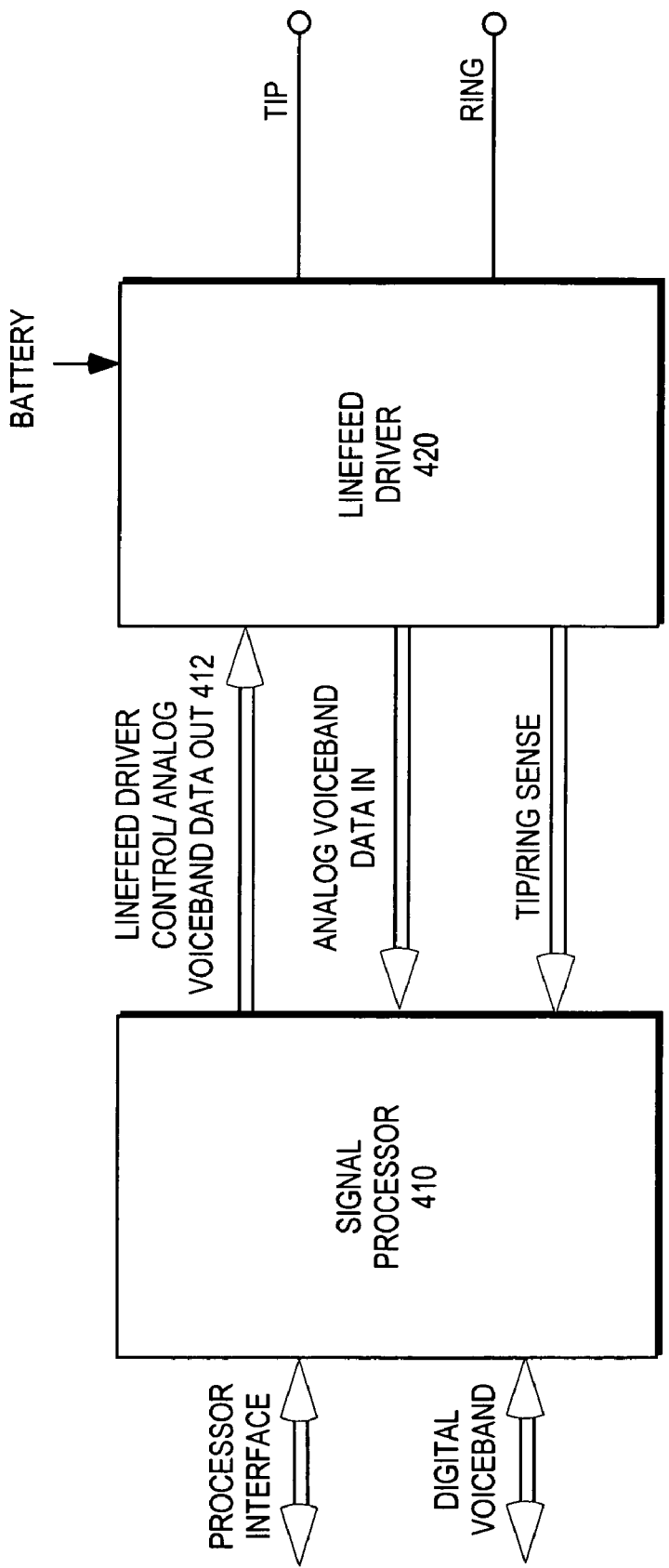
FIG. 4 illustrates a block diagram of an alternative embodiment of the SLIC.

FIG. 4 illustrates a block diagram of an alternative embodiment of an SLIC. Comparing FIG. 4 with FIG. 2, the primary difference is that a portion of the voiceband communication function (230) is handled by the same signal lines handling the linefeed driver control (212). In particular, signal lines 412 combine the linefeed driver control function with transmission of voiceband communications from the signal processor 410 to the linefeed driver 420 (i.e., audio out) for communication to the subscriber equipment.

Referring to FIG. 3, this is accomplished in one embodiment by superimposing the a.c. voiceband communications on the control currents I1 and I4. The bi-directional voiceband data interface includes nodes 324, 328, 342, and 348. Accordingly resistors RTT and RTR are eliminated in this configuration thus reducing the number of discrete components. Another advantage of this configuration is that the termination impedance previously determined by the values of RTT and RTR can now be set by controlling currents I1–I4. The use of a programmable signal processor 410 effectively places the value of the termination impedance formerly determined by RTT and RTR under programmatic control.

The central telephone exchange described above is merely one example of an SLIC application communicating with subscriber equipment using the POTS ("plain old telephone system") interface. Other SLIC applications include private exchanges and "zero loop" applications.

Zero loop applications often have a relatively short distance subscriber loop between the subscriber equipment and the SLIC. This is often the case when subscriber equipment must interface with a non-POTS systems such as a network that uses different communication media or protocols.

Figure 5:
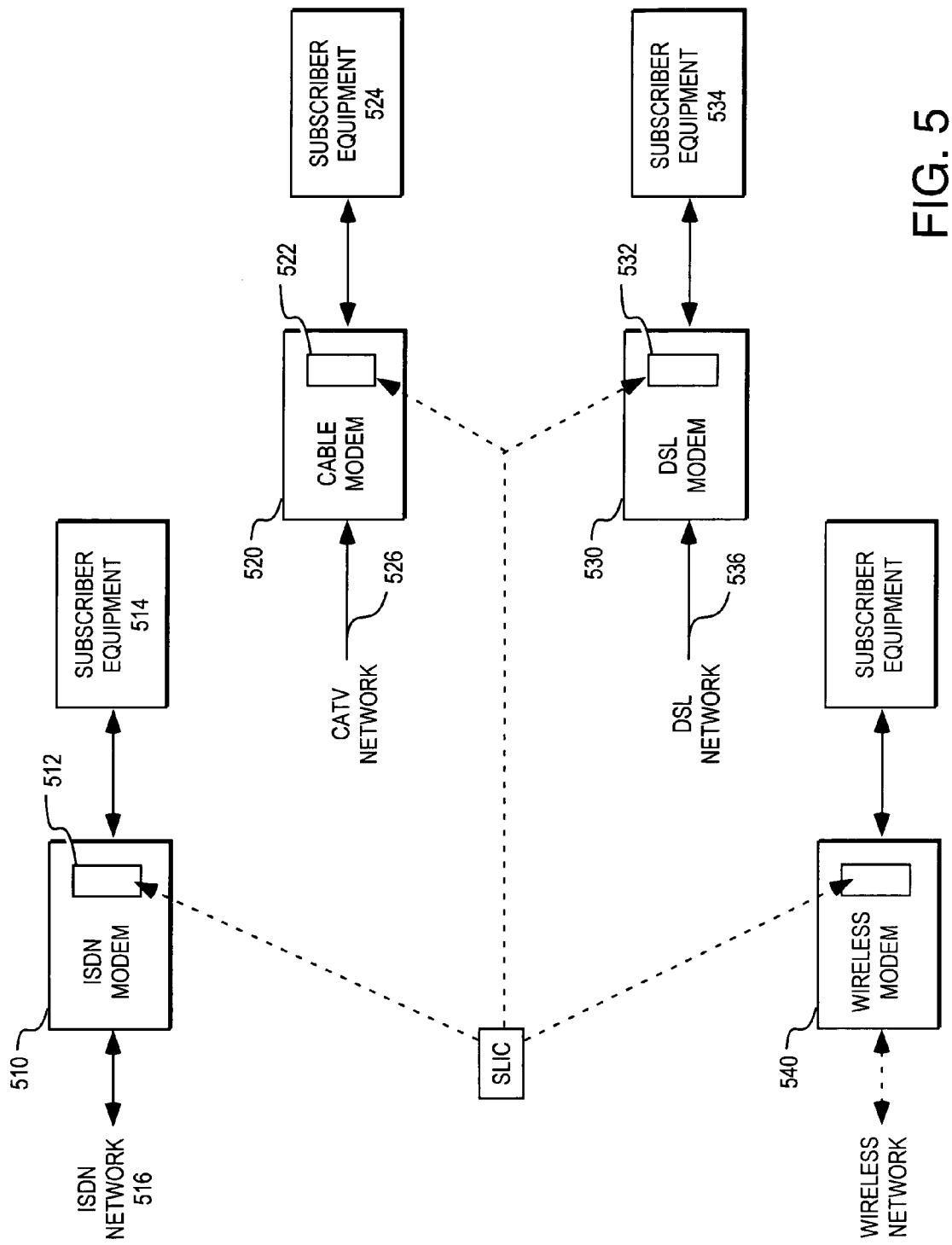
FIG. 5 illustrates alternative applications of the SLIC.

FIG. 5 illustrates various zero loop applications for the SLIC. In one embodiment, the SLIC 512 is used in an Integrated Services Digital Network (ISDN) modem 510. ISDN modem 510 provides bi-directional communication between subscriber equipment 514 and the ISDN network 516. In another embodiment, SLIC 522 is used in cable modem 520. In one embodiment, cable modem 520 communicates information using the community antenna television (CATV) network 516. SLIC 522 enables cable modem 520 to communicate information from the coaxial CATV cable 526 to subscriber equipment 524. In another example, digital subscriber line (DSL) modem 530 incorporates a SLIC 532 for communication between digital subscriber line 536 and subscriber equipment 534 having a POTS interface. Another example includes wireless applications such as wireless modem 540.

Given the widespread availability of subscriber equipment with a POTS interface and support for that interface, manufacturers are likely to continue to need to provide POTS compatible subscriber equipment even as the number of non-POTS communication services expands. Accordingly, the number of zero loop applications tends to grow with the number of non-POTS communications services in order to capitalize on the installed base of POTS compatible subscriber equipment.

Unlike the central exchange applications, the zero loop applications may enable the design of SLICs having relaxed performance characteristics. In particular, the zero loop application SLIC need not necessarily meet typical POTS standards if the subscriber equipment is not actually connected to the public telephone network. In such cases, the SLIC need only meet the minimum operational requirements of the subscriber equipment POTS interface. For example, the ringing function may be provided by periodic polarity reversal of the battery feed rather than a separate higher voltage ringing generator. Relaxation of other constraints may result in further simplification of the circuitry.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. An integrated circuit package comprising:
an integrated circuit having sense inputs for a sensed tip signal and a sensed ring signal of a subscriber loop, wherein the integrated circuit processes the sensed signals to generate a control signal for a subscriber loop linefeed driver, wherein the linefeed driver does not reside within a same integrated circuit.

2. The integrated circuit package of claim 1 wherein the sensed tip signal includes first and second sampled tip voltages, wherein a difference between the first and second sampled tip voltages is proportional to the tip current, wherein the sensed ring signal includes first and second sampled ring voltages, wherein a difference between the first and second sampled ring voltages is proportional to the ring current.

3. The integrated circuit package of claim 1 wherein the integrated circuit is a complementary metal oxide semiconductor (CMOS) integrated circuit.

4. A subscriber loop linefeed driver comprising:
sense circuitry providing a sensed tip signal and a sensed ring signal to sense inputs of an integrated circuit; and
power circuitry for providing battery feed to a ring node and a tip node of the subscriber loop in accordance with a control signal, the integrated circuit processing the sensed tip and ring signals to generate the control signal, wherein the power circuitry does not reside within the integrated circuit.

5. The subscriber loop linefeed driver of claim 4 wherein the sense circuitry comprises:
a tip resistor series-coupled to the tip node and the power circuitry;
a pair of tip sampling resistors one end of each tip sampling resistor connected to opposite ends of the tip resistor, the other end of each tip sampling resistor forming a tip sense node;
a ring resistor series-coupled to the ring node and the power circuitry;
a pair of ring sampling resistors one end of each ring sampling resistor connected to opposite ends of the ring resistor, the other end of each ring sampling resistor forming a ring sense node.

6. The subscriber loop linefeed driver of claim 4 wherein the sensed tip signal comprises first and second sampled tip voltages, wherein a difference between the first and second sampled tip voltages is proportional to the tip current, wherein the sensed ring signal includes first and second sampled ring voltages, wherein a difference between the first and second sampled ring voltages is proportional to the ring current.

7. The subscriber loop linefeed driver of claim 4 wherein the power circuitry comprises:
a tip control circuit, wherein the tip control circuit increases a tip node voltage in response to a first tip control signal, wherein the tip control circuit decreases a tip node voltage in response to a second tip control signal; and
a ring control circuit wherein the ring control circuit increases a ring node voltage in response to a first ring control signal, wherein the ring control circuit decreases a ring node voltage in response to a second ring control signal.

8. The subscriber loop linefeed driver of claim 7 wherein the tip control circuit comprises:
a first transistor of a first type having an emitter coupled to receive the first tip control signal;
a second transistor of the first type having an emitter coupled to receive the second tip control signal, wherein a base of each of the first and second transistors is coupled to first node;
a third transistor of a second type having a collector coupled to a collector of the first transistor and an emitter coupled to a second node;
a resistor having a first end coupled to the second node, a second end of the resistor coupled to a base of the third transistor and a collector of the second transistor.

9. The subscriber loop linefeed driver of claim 8 wherein the first type is a PNP bipolar junction transistor, wherein the second type is an NPN bipolar junction transistor.

10. The subscriber loop linefeed driver of claim 4 further comprising:
voiceband circuitry for bi-directional communication of voiceband data between the ring and tip nodes and an analog voiceband data interface, wherein the voiceband circuitry provides the analog voiceband data interface with d.c. isolation from the ring and tip nodes.

11. The apparatus of claim 10 wherein the voiceband circuitry further comprises:
a first voiceband data output node;
a load coupled to the first voiceband data output node;
a first voiceband data input node, wherein the load and the first voiceband data input node are capacitively coupled to a selected one of the tip and ring nodes.

12. The apparatus of claim 4 further comprising voiceband circuitry for bi-directional communication of voiceband data between the ring and tip nodes and a voiceband data interface, wherein the voiceband circuitry further comprises:
a first voiceband data input node capacitively coupled to a selected one of the ring and tip nodes for receiving voiceband data from the subscriber loop, wherein voiceband data transmitted to the subscriber loop is superimposed on the control signal.

13. An apparatus comprising:
an integrated circuit processing a sensed tip signal and a sensed ring signal of a subscriber loop to generate subscriber loop control signals, the sensed tip and ring signals received by sense inputs of the integrated circuit; and
a linefeed driver for driving a subscriber loop in accordance with the subscriber loop control signals, the linefeed driver providing the sensed tip and ring signals.

14. The apparatus of claim 13 wherein the integrated circuit is a complementary metal oxide semiconductor (CMOS) integrated circuit.

15. The apparatus of claim 13 wherein the linefeed driver comprises:
  power circuitry for providing battery feed to a ring node and a tip node of a subscriber loop in accordance with a linefeed control signal; and
  sense circuitry providing a sensed tip signal and a sensed ring signal, wherein the sensed tip and ring signals correspond to a tip current and a ring current of the subscriber loop.

16. The linefeed driver of claim 15 wherein the sense circuitry comprises:
  a tip resistor series-coupled to the tip node and the power circuitry;
  a pair of tip sampling resistors one end of each tip sampling resistor connected to opposite ends of the tip resistor, the other end of each tip sampling resistor forming a tip sense node;
  a ring resistor series-coupled to the ring node and the power circuitry;
  a pair of ring sampling resistors one end of each ring sampling resistor connected to opposite ends of the ring resistor, the other end of each ring sampling resistor forming a ring sense node.

17. The linefeed driver of claim 15 wherein the sensed tip signal comprises first and second sampled tip voltages, wherein a difference between the first and second sampled tip voltages is proportional to the tip current, wherein the sensed ring signal includes first and second sampled ring voltages, wherein a difference between the first and second sampled ring voltages is proportional to the ring current.

18. The linefeed driver of claim 15 wherein the power circuitry comprises:
  a tip control circuit, wherein the tip control circuit increases a tip node voltage in response to a first tip control signal, wherein the tip control circuit decreases a tip node voltage in response to a second tip control signal; and
  a ring control circuit wherein the ring control circuit increases a ring node voltage in response to a first ring control signal, wherein the ring control circuit decreases a ring node voltage in response to a second ring control signal.

19. The linefeed driver of claim 18 wherein the tip control circuit comprises:
  a first transistor of a first type having an emitter coupled to receive the first tip control signal;
  a second transistor of the first type having an emitter coupled to receive the second tip control signal, wherein a base of each of the first and second transistors is coupled to first node;
  a third transistor of a second type having a collector coupled to a collector of the first transistor and an emitter coupled to a second node; and
  a resistor having a first end coupled to the second node, a second end of the resistor coupled to a base of the third transistor and a collector of the second transistor.

20. The linefeed driver of claim 19 wherein the first type is a PNP bipolar junction transistor, wherein the second type is an NPN bipolar junction transistor.

21. The linefeed driver of claim 15 further comprising:
  voiceband circuitry for bi-directional communication of voiceband data between the ring and tip nodes and a voiceband data interface, wherein the voiceband circuitry provides the analog voiceband data interface with d.c. isolation from the ring and tip nodes.

22. The linefeed driver of claim 21 wherein the voiceband circuitry further comprises:
  a first voiceband data output node;
  a load coupled to the first voiceband data output node; and
  a first voiceband data input node, wherein the load and the first voiceband data input node are capacitively coupled to a selected one of the tip and ring nodes.

23. The apparatus of claim 15 further comprising voiceband circuitry for bi-directional communication of voiceband data between the ring and tip nodes and a voiceband data interface, wherein the voiceband circuitry further comprises:
  a first voiceband data input node capacitively coupled to a selected one of the ring and tip nodes for receiving voiceband data from the subscriber loop, wherein voiceband data transmitted to the subscriber loop is superimposed on the linefeed control signals.

* * * * *